US009822269B2

(12) United States Patent
Grinwald et al.

(10) Patent No.: US 9,822,269 B2
(45) Date of Patent: Nov. 21, 2017

(54) INKJET PRINTING

(71) Applicant: HEWLETT-PACKARD INDIGO B.V., Amstelveen (NL)

(72) Inventors: Yaron Grinwald, Nes Ziona (IL); Yana Reznick, Nes Ziona (IL); Adi Vinegrad, Nes Ziona (IL); Tzahi Maswari, Nes Ziona (IL); Gregory Katz, Nes Ziona (IL); Kobi Cohen, Netanya (IL); Dayan Benjamin, Netanya (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 66 days.

(21) Appl. No.: 14/417,111

(22) PCT Filed: Jul. 9, 2013

(86) PCT No.: PCT/EP2013/064479
§ 371 (c)(1),
(2) Date: Jan. 23, 2015

(87) PCT Pub. No.: WO2014/016112
PCT Pub. Date: Jan. 30, 2014

(65) Prior Publication Data
US 2015/0210877 A1 Jul. 30, 2015

(30) Foreign Application Priority Data

Jul. 24, 2012 (EP) ..................... 12177659

(51) Int. Cl.
| | |
|---|---|
| *B41J 2/21* | (2006.01) |
| *C09D 11/36* | (2014.01) |
| *B41M 5/025* | (2006.01) |
| *C09D 11/322* | (2014.01) |
| *C09D 11/107* | (2014.01) |
| *C09D 11/108* | (2014.01) |

(52) U.S. Cl.
CPC ............ *C09D 11/36* (2013.01); *B41J 2/2107* (2013.01); *B41M 5/0256* (2013.01); *C09D 11/107* (2013.01); *C09D 11/108* (2013.01); *C09D 11/322* (2013.01); *Y10T 428/24802* (2015.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................... 347/95–105
See application file for complete search history.

(56) References Cited

U.S. PATENT DOCUMENTS

| | | | |
|---|---|---|---|
| 4,784,905 A | 11/1988 | Suzuki et al. | |
| 5,112,398 A | 5/1992 | Kruse | |
| 6,532,870 B1 | 3/2003 | Kato et al. | |
| 6,557,979 B2 | 5/2003 | Ohsawa et al. | |
| 2001/0055047 A1* | 12/2001 | Ohsawa .................. | B41J 2/06 347/103 |
| 2003/0225188 A1 | 12/2003 | Horie | |
| 2006/0035999 A1* | 2/2006 | Bedford ................ | C09D 11/34 523/160 |
| 2006/0222985 A1 | 10/2006 | Tsubuko et al. | |
| 2007/0098469 A1 | 5/2007 | Yoshino et al. | |
| 2008/0011192 A1* | 1/2008 | Uozumi ................. | C09D 11/36 106/31.75 |
| 2010/0230038 A1 | 9/2010 | Gila et al. | |
| 2010/0245511 A1* | 9/2010 | Ageishi ................. | B41J 2/0057 347/102 |

FOREIGN PATENT DOCUMENTS

| | | |
|---|---|---|
| CN | 101007909 | 8/2007 |
| CN | 101250349 | 8/2008 |
| EP | 1744268 | 1/2007 |
| EP | 1947151 | 7/2008 |
| WO | 0063305 | 10/2000 |
| WO | 2005117555 | 12/2005 |

OTHER PUBLICATIONS

International Search Report dated Jan. 30, 2014 for International application No. PCT/EP2013/064479 filed Jul. 9, 2013, Applicant Hewlett-Packard Indigo B.V.

* cited by examiner

*Primary Examiner* — Manish S Shah
(74) *Attorney, Agent, or Firm* — Thorpe, North & Western L.L.P.

(57) ABSTRACT

An indirect inkjet printing method including providing a jettable ink composition, jetting said ink composition on a surface of an intermediate transfer member forming a film having an image thereon, and transferring said image to a printable substrate. The jettable ink composition includes a hydrocarbon carrier liquid, colorant and polymeric binder resin which is soluble in the hydrocarbon carrier liquid.

7 Claims, 3 Drawing Sheets

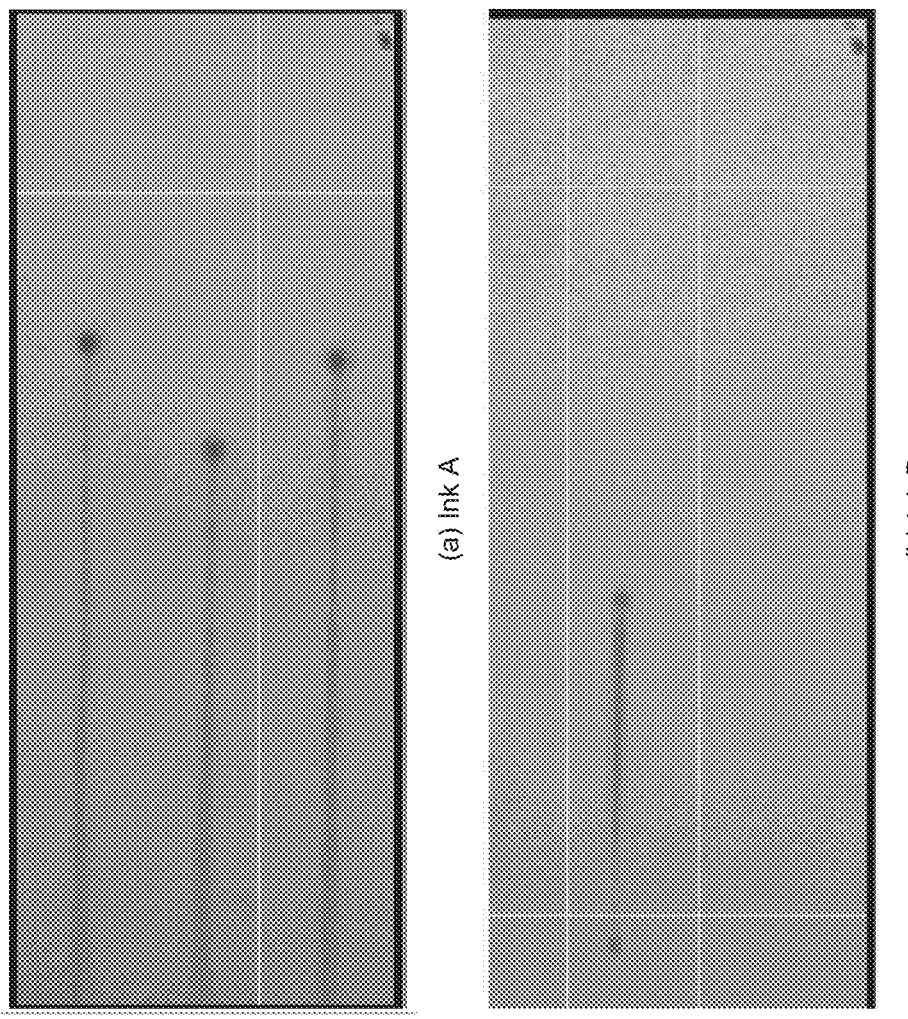

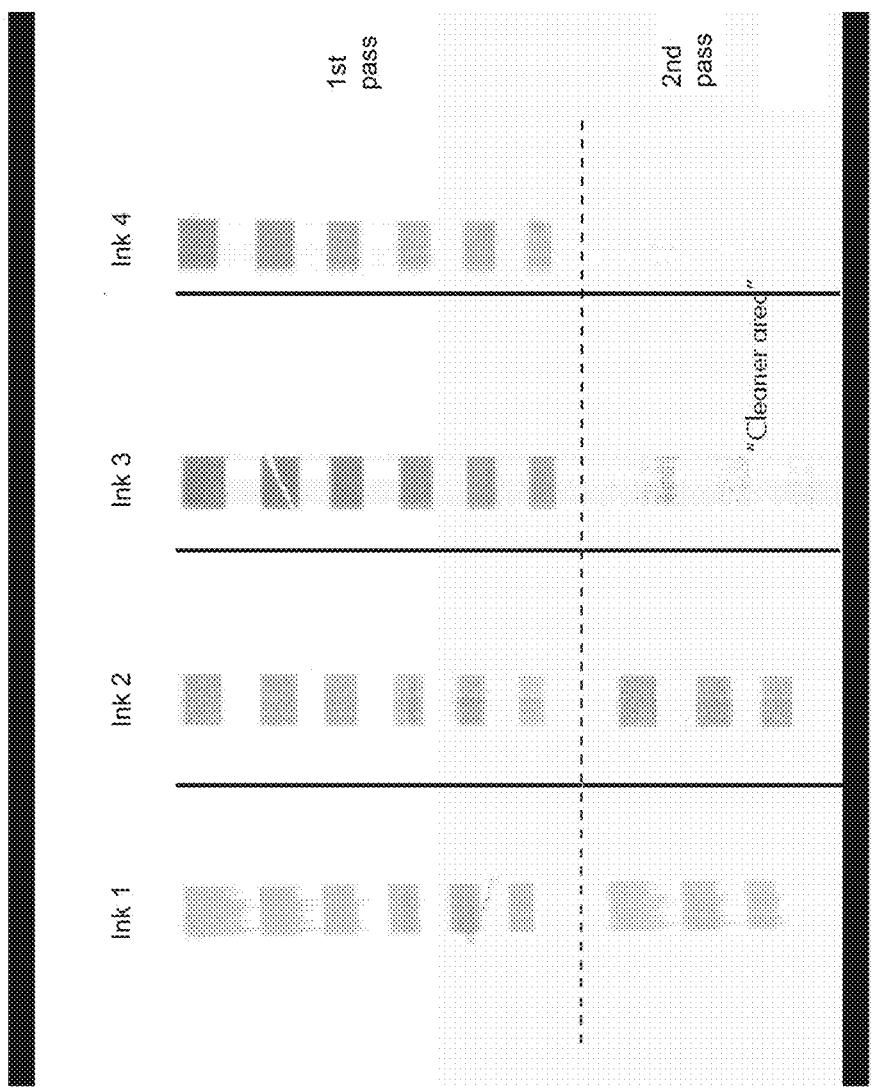

INKJET PRINTING

Inkjet printing systems involve ejecting ink droplets from orifices in a print head onto a receiving printable substrate (media) to form an image. In direct printing systems, the ink is ejected from jets in the print head directly onto the receiving media. Indirect print inkjet printing is a technique where ink droplets are ejected onto an intermediate transfer member (blanket) rather than directly onto the media. The ink image is thus dried on the intermediate transfer member and is then transferred to the media. In order to facilitate drying of the volatile part of the ink, an oil based formation rather than water based formulation may be used, due, in part, to the lower overall energy of evaporation. Such indirect transfer technique may also enhance compatibility with different types of media.

BRIEF DESCRIPTION OF THE FIGURES

FIG. 2 shows jetting results for two exemplary ink compositions, as prepared in the Examples.

FIG. 3 shows printing patterns for a series of exemplary jettable ink compositions.

DETAILED DESCRIPTION

Figure 1:
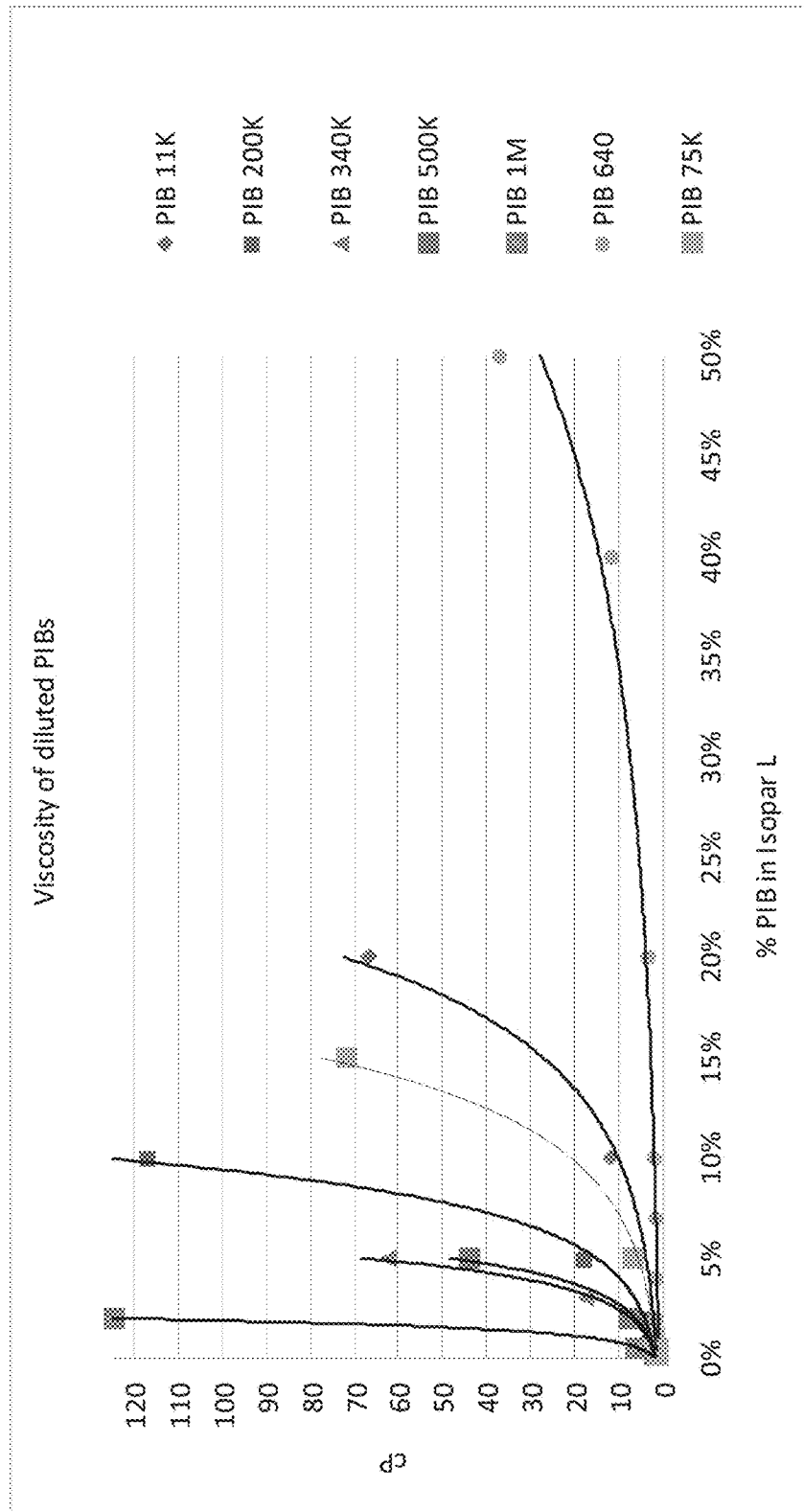
FIG. 1 is a graph showing viscosity profiles for a given concentration of oil soluble polymeric binder resin with varying molecular weight in a hydrocarbon carrier liquid, each of which can be used in examples of the jettable ink compositions described herein.

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "jettable ink composition" generally refers to an ink composition in liquid form that is typically suitable for use in an inkjet printing process such as, for example, an indirect inkjet printing process, i.e., a process wherein the print head of the printing device jets ink onto an intermediate transfer surface.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the ink composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, particle size properties referred to herein are as measured by the well known conventional method employed in the art of laser light scattering, using a Malvern Mastersizer machine as supplied by Malvern Instruments Ltd (or by other methods which give essentially the same result). In the laser light scattering technique, the size of particles in powders, suspensions, dispersions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values.

Unless otherwise stated, the percentage (%) of components expresses the weight percentage (wt. %) of components.

Unless other wise stated, the molecular weight (MW) of a polymer is the weight average molecular weight.

Unless otherwise stated, any feature described herein can be combined with any aspect described herein or any other feature.

In a first aspect, there is provided an indirect inkjet printing method, comprising:
  providing a jettable ink composition comprising:
    a hydrocarbon carrier liquid;
    colorant; and
    polymeric binder resin which is soluble in the hydrocarbon carrier liquid;
  jetting said ink composition on a surface of an intermediate transfer member forming a film comprising an image thereon; and
  transferring said image to a printable substrate.

In a second aspect, there is provided a jettable ink composition, comprising:
  a hydrocarbon carrier liquid;
  colorant; and
  polymeric binder resin which is soluble in the hydrocarbon carrier liquid.

In a third aspect, there is provided a method for making a jettable ink composition, said method comprising:
  mixing a hydrocarbon carrier liquid, colorant and polymeric binder resin to form a mixture; and
  agitating the mixture to obtain a jettable ink composition.

In a fourth aspect, there is provided a printed media having a layer comprising a polymeric binder resin and colored image, wherein the colored image is formed from a jettable ink composition comprising: a hydrocarbon carrier liquid; colorant; and polymeric binder resin which is soluble in the hydrocarbon carrier liquid. In some examples, the printed media substrate is producible by the method of the third aspect.

Hydrocarbon Carrier Liquid

The hydrocarbon carrier liquid is a liquid that comprises a hydrocarbon. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic hydrocarbons, paraffinic hydrocarbons, dearomatized hydrocarbon compounds, and the like. In particular, the carrier liquids can include, but are not limited to, IsoparG™, Isopar-H™, Isopar-L™, Isopar-M™, Isopar-K™, Isopar-10 V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). In some example, the carrier liquid comprises or is an isoparaffinic hydrocarbon including, for example, on or more of Isopar-G™, Isopar-H™, Isopar-L™, Isopar-M™, Isopar-K™ and Isopar-10 V™.

Carrier liquids of the present disclosure are described in U.S. Pat. No. 6,337,168, U.S. Pat. No. 6,070,042, and U.S. Pat. No. 5,192,638, all of which are incorporated herein by reference.

In some examples, the carrier liquid constitutes about 5 to 99.5% by weight of the ink composition, in some examples 20 to 99.5% by weight of the ink composition, in some examples 50 to 99.5% by weight of the ink composition, in some examples 60 to 99.5% by weight of the ink composition, in some examples 70 to 99.5% by weight of the ink composition in some examples 75% to 99.5% by weight of the ink composition, in some examples, in some examples 80 to 99.5% by weight of the ink composition, in some examples 85 to 99.5% by weight of the ink composition, in some examples 90 to 99.5% by weight of the ink composition. In other examples, the carrier liquid may constitute about 40 to 90% by weight of the ink composition. In other examples, the carrier liquid may constitute about 60 to 80% by weight of the ink composition, in some example about 50 to 70%, in some example about 40 to 60% by weight of the ink composition.

Colorant

The jettable ink composition comprises a colorant. The colorant may be a dispersed pigment, oil-soluble dye, or a combination thereof. The colorant may be a pigment selected from a black pigment, a cyan pigment, a yellow pigment, magenta pigment, white pigment, and any combination thereof. Such pigments are known to the skilled person. The pigment may be an inorganic pigment or an organic pigment. When the colorant is dispersed in the carrier liquid it can be any colorant compatible with the carrier liquid and useful for inkjet printing. For example, the colorant may be present as pigment particles, or may comprise a resin (in addition to the polymers described herein) and a pigment. The resins and pigments can be any of those commonly used as known in the art.

For example, pigments include, but are not limited to, Helliogen Blue pigment 7080 (available from BASF), Helliogen Green pigment (available from BASF), Cyan pigment (available from Toyo). The pigments can include, but are not limited to, optically variable pigments, thermochromic pigments, photochromic pigments, phosphorescent pigments, electroluminescent pigments, photoluminescent pigments, and combinations thereof. Non limiting examples of pigments are Mogul L (Cabot), Monastral Blue G (CI No. 74160), Toluidine Red Y (CL Pigment Red 3), Quindo Magenta (Pigment Red 122), Dalamar Yellow (Pigment Yellow 74, C.I. No. 11741), Monastral Green B (CI. Pigment Green 7). In another example, the pigments are organic pigments, for example, organic black pigments. In another example, the pigments are organic or inorganic particles as well known in the art. Suitable inorganic pigments include, for example, carbon black. Other inorganic pigments may be suitable such as titanium oxide, cobalt blue ($COO$—$Al_2O_3$), chrome yellow ($PbCrO_4$), and iron oxide. Exemplary organic pigments include azo pigments including diazo pigments and monoazo pigments, polycyclic pigments (e.g., phthalocyanine pigments), insoluble dye chelates, nitropigments, nitroso pigments, and the like. Exemplary phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Violet 19 and Pigment Violet 42. Examples of anthraquinones include Pigment Red 43, and Pigment Red 226.

Examples of perylenes include Pigment Red 149 (Scarlet), Pigment Red 179, Pigment Red 190, Pigment Violet 19, and Pigment Red 224. Examples of heterocyclic yellows include Pigment Yellow 1, Pigment Yellow 3, Pigment Yellow 17, Pigment Yellow 65, Pigment Yellow 73, Pigment Yellow 74, Pigment Yellow 155, Pigment Yellow 83 and Pigment Yellow 138. Such pigments are commercially available in either powder or press cake form from a number of sources including, BASF Corporation, Engelhard Corporation and Sun Chemical Corporation. Examples of black pigments that may be used include carbon pigments. The carbon pigment is any commercially available carbon pigment that provides acceptable optical density and print characteristics. Exemplary carbon pigments include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Exemplary carbon black pigments include, without limitation, Cabot pigments such as Monarch 1400, Monarch 1100, CAB-O-JET 200, Black Pearls, and Vulcan pigments; Columbian pigments such as Raven 7000 and Raven 3500; Degussa pigments such as Color Black FW 200, Raven FW S170, Special Black 6, Special Black 5, Special Black 4, and Printex 140V; and Tipure R-available from Dupont and the like. Examples of other suitable colored pigments are described in the Colour Index, 3rd edition (The Society of Dyers and Colourists, 1982). The above list of pigments includes unmodified pigment particulates, small molecule attached pigment particulates, and polymer-dispersed pigment particulates.

Further examples of pigments include, but are not limited to, those by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, 15 MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

When the colorant is an oil-soluble dye it can be any oil-soluble dye compatible with the carrier liquid and useful for inkjet printing. For example, the oil-soluble dye may be a yellow dye, a magenta dye, a cyan dye, a black dye, or any combination thereof.

Exemplary yellow dyes include, but are not limited to, an aryl or heteryl azo dye, an azomethine dye, a methine dye such as a benzylidene dye, a monomethineoxonol dye, a quinone dye such as a naphthoquinone dye, an anthraquinone dye, a quinophthalone dye, a nitro/nitroso dye, an acridine dye, and an acridinone dye. The yellow dye may comprise a counter cation, for example, an inorganic cation such as an alkali metal or ammonium, an organic cation such as pyridinium or quaternary ammonium salt.

Exemplary magenta dyes include, but are not limited to, an aryl or heteryl azo dye which has phenols, naphthols, anilines as a coupling component, an azomethine dye which has pyrazolones, pyrazolotriazoles as a coupling component, a methine dye such as an arylidene dye, a styryl dye, a merocyanine dye, an oxonol dye, a carbonium dye such as a diphenylmethane dye, a triphenylmethane dye, a xanthene dye, a quinone dye such as naphthoquinone, anthraquinone, or anthrapyridone, and a condensed polycyclic dye such as a dioxadine dye. The magenta dyes may comprise a counter cation, for example, an inorganic cation such as an alkali metal or ammonium, an organic cation such as pyridinium or quaternary ammonium salt.

Exemplary cyan dyes include, but are not Invited to, an azomethine dye such as an indoaniline dye, an indophenol dye, a polymethine dye such as a cyanine dye, an oxonol dye, a merocyanine dye; a carbonium dye such as a diphenylmethane dye, a triphenylmethane dye, a xanthene dye, a phthalocyanine dye, an anthraquinone dye; an aryl or heteryl azo dye which has phenols, naphthols, anilines as a coupling component, and an indigo/thioindigo dye. The cyan dyes may comprise a counter cation, for example, an inorganic cation such as an alkali metal or ammonium, an organic cation such as pyridinium or quaternary ammonium salt.

In some examples, the colorant constitutes up to about 20% by weight of the jettable ink composition, for example, up to about 15% by weight, or up to about 10% by weight, or up to about 8% by weight, or up to about 6% by weight, or up to about 4% by weight, or up to about 2% by weight, or up to about 1% by weight. In some examples, the jettable ink composition comprises at least about 0.05% by weight colorant, for example, at least about 0.1% by weight colorant.

If the colorant comprises pigment particles they will be of size suitable for ink jetting. In some examples, the pigment particles will have a particle size of less than about 10 µm, for example, less than about 5 µm, or less than about 1 µm. In some examples, the pigment particles have a $d_{50}$ of less than about 10 µm, for example, less than about 5 µm, or less than about 1 µm. In some examples, the pigment particles have a submicron particle size, for example, a $d_{50}$ of less than about 900 nm, or less than about 800 nm, or less than about 700 nm, or less than about 600 nm, or less than about 500 nm. In some examples, the pigment particles have a $d_{50}$ of from about at least about 70 nm, for example, from about 70 to about 500 nm, for example, from about 150 to about 500 nm, or from about 150 to about 400 nm, or from about 200 to about 500 nm, or from about 200 to about 400 nm.

Polymeric Binder Resin

The polymeric binder resin is oil-soluble, i.e., substantially soluble in the hydrocarbon carrier liquid, and ink-jettable. Advantageously, the polymeric binder resin is capable of forming a film (or image), for example, a substantially continuous film (or image), on a surface of an intermediate transfer member (.e.g., blanket), wherein said film (or image) is transferred from the intermediate transfer member to a printable substrate (media), for example, paper.

The polymer binder resin can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes, in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

In some examples, the polymeric binder resin has a (weight average) molecular weight of from about 0.5K to about 2M g/mol (grams per mole), for example, from about 0.5K to about 1.5M g/mol, or from about 0.5K to about 1M g/mol, or from about 1K to about 750K g/mol, or from about 10K to about 500K g/mol, or from about 50K to about 500K g/mol, or from about 70K to about 400K g/mol, or from about 70K to about 350K g/mol, or from about 70K to about 300K g/mol, or from about 70K to about 250K g/mol, or from about 70K to about 200K g/mol, or from about 70K g/mol to about 150K g/mol, or from about 0.5K to about 10K g/mol, or from about 0.5K to about 8K g/mol, or from about 0.5K to about 6K g/mol, or from about 0.5K to about 4K g/mol, or from about 0.5K to about 3K g/mol, or from about 0.5K to about 2.5K g/mol, or from about 0.5K to about 2K g/mol.

The polymeric binder resin can include, but is not limited to, a thermoplastic polymer. In some examples the polymer binder resin may be selected from olefin resins, for example, polyalkylene resins such as polyethylene resin, polypropylene resin, polybutylene resin, and polyisobutylene resin; copolymers of styrene and derivatives thereof, such as butadiene-styrene copolymer, isoprene-styrene copolymer, styrene-methacrylate copolymer, styrene-acrylate copolymer, styrene-maleic resins; vinyl resin, for example, ethylene-vinyl acetate copolymer resins, vinyl chloride-vinyl acetate copolymer resins, vinyl acetate resins, and ethylene-vinyl chloride-vinyl acetate copolymer resins; acrylic resins, for example, methacrylic acid ester resins, polyacrylic acid ester resins, ethylene-ethyl acrylate copolymer resins, and ethylene-methacrylic acid ester copolymer resins; phenol resins; polyurethane resins; polyamide resins; polyester resins; ketone resins; rosin resins; epoxy resins; alkyd resins; maleic acid resins; butyral resins; terpene resins; petroleum resins, such as aliphatic hydrocarbon resins, aromatic modified aliphatic hydrocarbon resins, and aromatic modified, cycloaliphatic hydrocarbon resins; and hydrogenated terpene resins. These polymeric binder resins can be employed singly or as a mixture of two or more kinds thereof.

In some examples, the polymeric binder resin comprises polyalkylene resins, for example, polyethylene resin, polypropylene resins, polybutylene resin and polyisobutylene resin, which may be employed singly or in combination with other polyalkylene resin(s), or the other polymer binder resins described above, for example, a petroleum resin, such as aliphatic hydrocarbon resin, aromatic modified aliphatic hydrocarbon resin, and/or aromatic modified cycloaliphatic hydrocarbon resins, for example, petroleum resins having a weight average molecular weight of an aliphatic hydrocarbon resin having a molecular weight of less than about 4K g/mol, or less than about 3 K g/mol, or less than about 2K g/mol, or less than about 1.5K g/mol, or less than about 1K g/mol. Exemplary petroleim resins include the Escorez™ 1000, 2000 and 5000 series, available from ExxonMobil®. In some examples, the polymeric binder resin comprises a combination of a polyisobutylene resin, for example, polyisobutylene resin having a molecular weight of less than about 500K g/mol, or less than about 200K g/mol, or less than about 100 K g/mol, or greater than about 10K g/mol, or greater than about 50K g/mol, and a petroleum resin, such as aliphatic hydrocarbon resin, aromatic modified aliphatic hydrocarbon resin, and/or aromatic modified cycloaliphatic hydrocarbon resins, for example, petroleum resins having a weight average molecular weight of an aliphatic hydrocarbon resin having a molecular weight of less than about 4K g/mol, or less than about 3 K g/mol, or less than about 2.5 K g/mol, or less than about 2K g/mol, or less than about 1.5K g/mol, or less than about 1K g/mol. The polyisobutylene resin may constitute from about 0.5 to about 20 wt. % of the polymeric binder resin and the petroleum resin may comprise from about 80 to 99.5 wt. % of the polymeric binder resin. In some example, the polyisobutylene resin may constitute less than about 15 wt. % of the polymeric binder resin, for example, less than about 10 wt. % of the polymeric binder resin, with the balance petroleum resin.

In some examples, the polymeric binder resin comprises a copolymer of styrene and derivatives thereof, for example, butadiene-styrene copolymer, isoprene-styrene copolymer, styrene-methacrylate copolymer and styrene-acrylate copolymer, which may be employed singly or in combination with other copolymer(s) of styrene or the other polymeric binder resins described above. In some examples, the polymeric binder resin comprises or is a styrene-acrylate copolymer, for example, a derivatized styrene-acrylate copolymer, for example, a substituted styrene acrylate polymer, examples of which include Piloway® Ultra200 and Piloway® Ultra350 available from Eliokem®. In some examples, the styrene-copolymer, for example, styrene-acrylate copolymer, is substituted, i.e., has a substituent on the aromatic ring of the styrene moiety. In some examples, substituent is selected from alky, alkenyl, alkynyl, alkenyl or alkoxy. The alkyl substituent(s) may be a $C_1$-$C_6$, straight or branched chain group, for example, methyl, ethyl, propyl, isopropyl, butyl, t-butyl, penty or hexyl. The alkenyl substituent(s) may be a $C_2$-$C_6$ group, for example, ethenyl (vinyl), propenyl, butenyl, pentenyl, or hexenyl. The alkynyl substituent(s) may be ethynyl, propynyl, butynyl, pentynyl or hexynyl. The alkoxy substituent(s) may be a $C_1$-$C_5$ alkoxy group, for example, methoxy, ethoxy, propoxy, butoxy, or pentoxy. In some examples, the aromatic ring of the styrene moiety is substituted with a methyl group. In some examples, the aromatic ring of the styrene moiety is substituted with a vinyl group. In some examples, the aromatic ring of the styrene moiety is substituted at more than one position, for example, two substituents, for example, three substituents. The substituent groups may be located meta, para or ortho about the aromatic ring. The substituents may be selected from any of the substituents described above. In some examples, the styrene moiety is substituted with a methyl group and a vinyl group (i.e., forming a vinyl toluene moiety).

In some examples, the polymeric binder resin constitutes from about 0.1 to about 70% by weight of the jettable ink composition, for example, from about 0.5 to about 50% by weight, or from about 1 to about 40% by weight, or from about 1 to about 30% by weight, or from about 1 to about 25% by weight, or from about 1 to about 20% by weight, or from about 1 to about 15% by weight, or from about 1 to about 10% by weight. In further examples, the polymeric binder resin constitutes at least about 2% by weight, or at least about 3% by weight, or at least about 4% by weight, or at least about 5% by weight, or at least about 6% by weight, or at least about 7% by weight, or at least about 9% by weight of the jettable ink composition.

As described above, the jettable ink composition is suitable for use in an inkjet printing process such as, for example, an indirect inkjet printing process, i.e., a process wherein the print head of the printing device jets ink onto an intermediate transfer surface. In some examples, the jettable ink composition has a viscosity which is equal to or less than about 50 cps at the operating temperature of the ink-jet printing process in which the jettable ink composition is to be employed, for example, equal to or less than about 40 cps, or equal to or less than about 30 cps, or equal to or less than about 25 cps, or equal to or less than about 20 cps, or equal to or less than about 15 cps, or equal to or less than about 10 cps. In some example, the jettable ink composition has a viscosity of at least about 1 cps, for example, at least about 5 cps at the operating temperature of the ink-jet printing process in which the jettable ink composition is to be employed. Operating temperatures may vary between room temperature, e.g., about 20° C. to about 150° C., for example, equal to or less than about 140° C., or equal to or less than about 130° C., or equal to or less than about 125° C., or equal to or less than about 100° C., or equal to or less than about 80° C., or equal to or less than about 60° C., or equal to or less than about 40° C., or equal to or less than about 30° C. In some examples, room temperature is about 18° C., or about 19° C., or about 20° C., or about 21° C., or about 22° C., or about 23° C., or about 24° C., or about 25° C.

The viscosity of the jettable ink composition may vary depending on, for example, the type and molecular weight of the polymeric binder resin. Thus, in some examples, the jettable ink composition may contain additives to adjust (i.e., to increase or decrease) the viscosity of the jettable ink composition, for example, viscosity modifier(s). In some examples, the viscosity of the jettable ink composition is varied using dispersant described below. Advantageously, the use of dispersants may additionally serve to stabilise any solid particles, e.g., dispersed particles of pigment colorant or other non-volatile substances (NVS), comprised in the jettable ink composition.

In examples, the dispersant may constitute from about 0.5 to about 50% by weight of the ink composition, for example, from about 1 to about 40% by weight, or from about 1 to about 30% by weight, or from about 1 to about 25% by weight, or from about 5 to about 20% by weight, or from about 5 to about 15% by weight of the ink composition. The dispersant may comprise a mixture of two or more different dispersants.

Exemplary dispersants generally include molecules with a polar portion and a non-polar portion. The dispersant may be oil-soluble. The surfactant may be soluble in the hydrocarbon carrier liquid. The dispersant typically will have a head group and tail group typically of different polarity, e.g. the head group being polar and the tail group being relatively non-polar compared to the head group. The dispersant may comprise an acidic head group, e.g. a head group comprising a carboxylic acid, or a quaternary amine. The dispersant may comprise a basic head group. The basic head group may comprise an amine group, which may be selected from a primary amine group and a secondary amine group. The basic head group may comprise a plurality of amine groups, which may each independently be selected from a primary amine group and a secondary amine group.

In some examples, the dispersant may be selected from anionic dispersant, cationic dispersant, amphoteric dispersant, non-ionic dispersant, polymeric dispersant, oligomeric dispersant, crosslinking dispersant, or combinations thereof. In some examples the dispersant comprises or is a polymeric dispersant, for example, a polymeric dispersant with an amine head group.

In some examples, the dispersant comprises or is a succinimide. The succinimide may be linked, e.g. via a hydrocarbon-containing linker group, to an amine group. In some examples, the surfactant comprises a polyisobutylene succinimide having a head group comprising an amine. Exemplary polyisobutylene succinimides include OLOA-1200® (Chevron Oronite), Lubrizol®6406 and Lubrizol®2153 (Lubrizol).

In some examples, the dispersant comprises or is a polyamide-based dispersing agent that has a main chain structure having pendant therefrom a plurality of side chains composed of polyesters. The main chain comprises a plurality of nitrogen atoms such as polyethyleneimine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups. Such polyamide-based dispersants are commercially available as Solsperse 11200® and Solsperse 28000® made by Lubrizol.

Other suitable dispersants include basic functional dispersants, such as Solsperse 13300 and 17000, both made by Lubrizol®.

In some example, the dispersant comprises or is a modified fatty-acid, for example, a fatty-acid modified polyester. The fatty acid component may be stearic acid or a metal salt thereof, e.g., calcium or aluminum. Such dispersants are commercially available as Efka 6220 and Efka-6225 made by BASF.

In some examples, the dispersant comprises or is an acrylic block copolymer, for example, a polyacrylate and/or derivatives thereof. Such dispersants are commercially available as Efka 4300 made by BASF.

The anionic dispersant may be or comprise sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium.

The cationic dispersant may be selected from quaternary amine polymers, protonated amine polymers, and polymers containing aluminum (such as those that are available from Lubrizol Corp., Wickliffe, Ohio). Further examples of cationic dispersants include SOLSPERSE® 2155, 9000, 13650, 13940, and 19000 (Lubrizol Corp.) and other like cationic dispersants.

The amphoteric dispersant may be selected from dispersants that contain compounds having protonizable groups and/or ionizable acid groups. An example of a suitable amphoteric dispersant includes lecithin.

The non-ionic dispersant may be selected from oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like.

The oligomeric dispersant may be selected from low average molecular weight (i.e., less than 5000, or less than about 4000, or less than about 3000, or less than about 2000, or less than about 1000) non-ionic dispersant.

The cross-linking dispersant may be selected from polymers or oligomers containing two or more carbon double bonds (C═C) and/or free amine groups such as, e.g., polyamines, crosslinkable polyurethanes, and divinyl benzene.

Other suitable dispersants include OS#13309AP, OS#13309AQ, 14179BL, and 45479AB from Lubrizol Corp, which are dispersants based on polyisobutylene succinic acid with polyethyleneimines. These dispersants are combination polymers that are cationic in nature.

In some examples, the method the first aspect is implemented on a printing machine, in which one or more, for example, four, inkjet print heads define the image to be printed by dispensing, e.g., projecting, said ink onto an intermediate transfer surface. In some examples, the intermediate transfer surface is the surface of an intermediate transfer member, which may have the form of a cylinder, for example, a drum or roller. The surface on which the image is formed may be on a rotating member, e.g. in the form of a drum or cylinder. The intermediate transfer member may be a rotating flexible member, which may be heated, e.g. to a temperature of from 50 to 160° C., in some examples, from 80 to 130° C. The surface may be the surface of a blanket material placed on the intermediate transfer member. The blanket material may include silicone coated polyester, silicone coated rubber, silicone coated paper, silicone-coated aluminium, or other suitable materials than can receive the jettable ink in the desired manner (i.e., such that a (continuous) film comprising an image is formed which is then transferrable to a printable media substrate.

In some examples, the jettable ink composition dries on the intermediate transfer surface forming a continuous film comprising an image. The intermediate media transfer surface then contacts a printable media substrate (e.g., a sheet of paper), at which stage the film comprising the image is transferred to the printable media substrate. Non-limiting examples of such inkjet printing techniques include thermal, acoustic, and piezoelectric inkjet printing.

The printable media substrate may be or comprise any suitable substrate. The printable media substrate may be any suitable substrate capable of having an image printed thereon. The printable media substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and copolymers such as styrene-polybutadiene. The polypropylene may in some examples be biaxially orientated polypropylene. In some examples, the printable media substrate comprises a cellulosic paper. In some examples, the cellulosic paper is coated with a polymeric material, e.g. a polymer formed from styrene-butadiene resin. In some examples, the cellulosic paper comprises a filler material, for example, an inorganic material which may be bound a polymeric material. The inorganic material may be selected from, for example, kaolinite or calcium carbonate. The printable media substrate is in some examples a cellulosic print medium such as paper. The cellulosic print medium is in some examples a coated cellulosic print medium, e.g. having a coating of a polymeric material thereon.

The method of the first aspect may be carried out so that a plurality of impressions or copies are carried out. The number of impressions or copies may be at least 1000, in some examples at least 2000, in some examples at least 3000, in some examples at least 5000. The print coverage on each printed media substrate in each impression may be 40% or less, in some examples 30% or less, in some examples 20% or less. An impression may be a single image of one colour formed on a print substrate. A copy may be a single image having a plurality of colours, e.g. selected from black, magenta, cyan and yellow.

The method of the first aspect may be carried out so that a plurality of print media sheets are printed, for example 250 or more print media sheets, in some examples 500 or more print media sheets, in some examples 750 or more print media sheets, in some examples 1000 or more print media sheets. The sheets may be any suitable size or shape, e.g. of standard printing size, such as A4 or A3.

As used herein, "image" or "images" refers to marks, signs, symbols, figures, indications, and/or appearances deposited on a printable media substrate. Examples of an image may include characters, words, numbers, alpha-numeric symbols, punctuation, text, lines underlines, highlights, and the like.

In some examples, the jettable inks and methods of the invention are utilized using an inkjet set comprising or consisting of magenta, cyan, yellow and black inks.

In some examples, the jettable ink composition comprises an amount of non-volatile substances (VNS), other than the polymer binder resin. NVS are components of the ink which do not evaporate on drying on when applied to the intermediate transfer surface. NVS include solid particles, for example, pigment particles.

In some example, the jettable ink composition comprises other types of additives which may be employed in the ink composition to optimize the properties of said ink composition. For example, the ink composition may also include any number of surface modifiers and any additional additives.

The jettable ink compositions may be made according to the following methods. Thus, in a second aspect, the method comprises mixing a hydrocarbon carrier liquid, polymeric binder resin and colorant to form a mixture, for example, a slurry. In some examples a dispersant is included. In some examples, in which the colorant is a pigment, for example, a solid particulate pigment, the mixture may further comprise a dispersant or combination of dispersants. The type and amounts of each component may be that as described above in connection with the first and second aspects. In some examples, other components such as surface modifiers and additives may be added to the mixture at this stage. The mixture is then agitated, e.g., vigorously stirred, ground or milled for a period of time grinded for a period of time to obtain a substantially homogenous ink composition. In examples in which the colorant is a pigment, for example, a solid particulate pigment, the mixture may be milled or ground for a period of time such that said solid particulates are dispersed and the particle size of solid particulates is reduced, for example, to less than about 10 μm, for example, less than about 5 μm, for example, less than about 1 μm, for example, sub-micron, for example, less than about 900 nm, for example, less than about 700 nm, for example, less than about 500 nm. In some example, the particle size of dispersed solid particulates is from about 70 to about 500 nm. In some examples, milling/grinding is performed for a period of time until a viscosity in the range of about 1 to about 50 cps at 25° C. is obtained, for example, a viscosity of about 2 to about 40 cps at 25° C., or a viscosity of about to 2 to about 30 cps at 25° C., or a viscosity of 2 to about 20 cps at 25° C.

In some examples, pigment, dispersant, and hydrocarbon carrier liquid are combined and milled/ground prior to addition of polymeric binder resin. In some examples, the pigment, dispersant and hydrocarbon carrier liquid are milled/ground to about a dispersion of the pigment (any other solid particulate present). In some examples, the oil-soluble polymeric binder resin is mixed with a portion of hydrocarbon carrier liquid, and then combined with the pigment-dispersion in appropriate amounts to obtain the desired ink composition. In some example, the oil-soluble polymer binder resin is combined with the hydrocarbon carrier liquid by stirring, for example, using a magnetic stirrer, to dissolve the oil-soluble polymeric binder resin. The stirring may be carried out a room temperature or an elevated temperature, for example, a temperature of up to about 100° C., for example, up to about 80° C., for example, up to about 60° C. The stirring may be continued for a suitable period of time to dissolve the oil-soluble polymeric binder resin in the hydrocarbon carrier liquid. The period of time will vary depending the amount and type of polymeric binder resin and hydrocarbon carrier liquid. In some examples, stirring is carried out for a period of up to about 16 hours, for example, up to about 12 hours, or up to about 10 hours, or up to about 8 hours, or up to about 6 hours, or up to about 4 hours, or up to about 2 hours. The hydrocarbon carrier liquid used to prepare the pigment dispersion and mixed with the oil-soluble polymeric binder resin may be the same or different, typically the same for any given ink composition.

In some examples the agitation process, e.g., the grinding or milling process, is thermally controlled, e.g., to maintain a constant temperature during the grinding process. The temperature may be room temperature or, for example, about 25° C. In some example, the temperature is maintained (i.e., kept constant) at any temperature between about 20 and 80° C., for example, between about 25 and 60° C. or, for example, between about 25 and 40° C., or between about 25 and 35° C., or between about 20 and 30° C.

In some examples, the hydrocarbon carrier liquid, pigment, dispersant and polymeric binder resin are mixed in a mixer (e.g., double planetary mixer and the like. In some example, the milling/grinding is made with a grinder or mill, e.g., an attritor, a disk mill, sand mill, a ball mill, a bead mill, an impeller attrition mill, a vibro-energy mill, or the like, and milled/ground for a period of time to form the jettable ink composition of requisite viscosity. In some example, the mixture of ink components is ground/milled for about 10 mins to about 5 hours, for example, from about 15 mins to about 5 hours, or from about 30 mins, or from about 45 mins to about 4.5 hours, or from about 1 hour to about 4 hours, or from about 2 hours to about 5 hours, or from about 3 hours to about 5 hours, or from about 4 hours to about 5 hours. In some example, revolutions per minute (RPM) range from about 50 to about 1000, for example, from about 100 to about 900, or from about 200 to 800, or from about 300 to about 700, or at least about 400, or at least about 500, or at least about 600. A person of sill in the art will understood that the grinding time and the grinding speed will vary depending on the amount of material to be ground, the desired viscosity of ink composition, and the size and type of the grinding/milling apparatus.

The milling/grinding process may be carried out with or without grinding media, such as zirconia or stainless steel balls. The grinding media may be relatively fine, e.g., balls/beads having a diameter of less than about 1 mm, for example, less than about 0.2 mm, for example, equal to or less than about 0.6 mm. In some example, the grinding media has a diameter of at least about 0.05 mm, for example, at least about 0.075 mm, for example, equal to or greater than about 0.1 mm. In some examples, the grinding media include table salt, glass beads, zirconia beads, ceramic beads, plastic beads, or stainless steel beads. In one example, the grinding/milling is carried out using a ball mill with zirconia beads as the grinding media.

At any stage of the method for preparing the ink composition, further dispersant may be added to modify or enhance the stability of the ink composition, and/or to modify the viscosity of the ink composition.

If prepared separately, the dispersions of pigment and solutions of polymeric resin may be mixed in suitable amounts to form a jettable ink composition. The relative amount of dispersion and solution in the mixture will depend on the desired composition of the jettable ink composition. In some examples, the weight ratio of pigment dispersion to binder resin solution may be from about 10:1 to about 1:10, for example, from about 1:1 to about 1:10, for example, from about 1:2 to about 1:10, for example, from about 1:3 to about 1:10, for example, from about 1:4 to about 1:10, for example, about 1:1, or about 1:2, or about 1:3, or about 1:4, or about 1:5.

The jettable ink composition may be formed by vigorously agitating the mixture of pigment dispersion and binder solution, e.g., by shearing. Agitation/shearing may be conducted by conventional means such as ultrasonic dispersers, or high speed mechanical mixers such as Rotor/stator mixer, Ystral (®) or Ultra Turrax (®). Agitation/shearing may be carried for a period of time sufficient to form the jettable ink composition. For example, the high speed mechanical mixer may be operated at a speed of at least about 5000 rpm, for example, at least about 10,000 rpm, or at least about 15,000 rpm, or equal to or greater than about 20,000 rpm, for a period of up to about 60 minutes, or up to about 30 minutes, or up to about 20 minutes, or up to about 10 minutes, or for about 9 minutes, or about 8 minutes, or about 7 minutes, or about 6 minutes, or about 5 minutes, or about 4 minutes, or about 3 minutes, or about 2 minutes. In some examples, the period of time is at least about 30 seconds, for example, at least about 1 minute.

In some examples of the fourth aspect, a printed media subtracted, e.g., paper, having a layer comprising a colored image is provided. The colored image is formed from a jettable ink composition comprising: a hydrocarbon carrier liquid; colorant; and polymeric binder resin which is soluble in the hydrocarbon carrier liquid. In some examples, the printed media substrate is producible by the method of the first aspect. In some examples, the printed image exhibits advantageous fixing and adhesion to the paper and, thus, low peeling.

EXAMPLES

The following examples illustrate a number of variations of the present compositions and methods that are presently known to the inventors. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1

A blue pigment (from Toyo™ Ink) was dispersed in Isopar-L by circulating in a ball mill (Eiger) with fine media (0.1-0.6 mm) and high RPM for 4 hours, maintaining a constant temperature of 25° C. Dispersant (Lubrizol6406) was added with the pigment at 10% on solids. The pigment concentration during grinding was 5-20%.

A first polymeric binder was prepared by dissolving 1 wt. % polyisobutylene (PIB) having a molecular weight of 75K in Isopar-L. The polymeric binder was dissolved in Isopar-L by stirring (with a magnetic stirrer) overnight at room temperature. Further binder compositions were prepared in the same manner using PIBs of different molecular weight and different concentration of PIB. Viscosity profiles for a given concentration of PIB with varying MW in Isopar-L is presented in FIG. 1.

Another polymeric binder was prepared by dissolving 15 wt. % Escorez 5320 in Isopar-L.

Ink compositions where formulated by combining the pigment dispersion with the PIB solution (Ink A) and Escorez solution (Ink B); 5 parts pigment dispersion to 20 parts PIB solution. Jetting results are presented in FIGS. 2(a) and (b).

Example 2

Four ink compositions were prepared, referenced as ink (1), ink (2), ink (3) and ink (4). Details of each composition are summarised in Table 1.

Each ink was prepared by preparing, separately, a dispersion of pigment and binder solution. The pigment dispersion was prepared by combining pigment, dispersant and carrier liquid and milling in a bead mill. The milling process was thermally controlled, and viscosity and particle size monitored until a low viscosity (2-20 cps @ 25° C.) paste-like sub-micron (70-500 nm) dispersion was obtained.

TABLE 1

|  | Ink 1 | Ink 2 | Ink 3 | Ink 4 |
| --- | --- | --- | --- | --- |
| Carrier liquid (wt. %) | Isopar-L, 80 wt. % | Isopar-L, 82 wt. % | Isopar-L, 78 wt. % | Isopar-L, 85 wt. % |
| Pigment (wt. %) | 4 wt. % | 6 wt. % | 3 wt. % | 3 wt. % |
| Binder resin (wt. %) | Fareline (RTM), 12 wt. % | Regalite (RTM), 15 wt. % | Ultra 200, 15 wt. % | Ultra 200, 20 wt. % |
| Dispersant (wt. %) | Lubrizol6406, 2 wt. % | Lubrizol6406, 5 wt. % | Lubrizol6406, 5 wt. % | Lubrizol6406, 4 wt. % |
| Viscosity (cps) @ 25° C. | 4-6 cP | 7-10 cP | 2-5 cP | 2-7 cP |

Each ink composition was jetted on a blanket and in each case film forming occurred on drying, i.e., evaporation of carrier liquid (Ink A @ 135° C.; Ink B @ 145° C.; Ink C at 130° C.; Ink D @ 120° C.). Transferability of each film to paper was assessed by attaching paper to the blanket (a 1$^{st}$ pass). A 2$^{nd}$ pass was carried out (i.e., by attaching a second sheet of paper to the blanket). Printing patterns for each ink are presented in FIG. 3. As can be seen, best transferability was seen for Inks 3 and 4 wherein substantially no ink was left on the blanket after the 1$^{st}$ pass.

The invention claimed is:

1. An indirect inkjet printing method, comprising: providing a jettable ink composition comprising:
   a hydrocarbon carrier liquid;
   colorant; and
   polymeric binder resin which is soluble in the hydrocarbon carrier liquid; wherein the polymeric binder resin in the jettable ink composition is dissolved in the hydrocarbon carrier liquid forming a solution;
   jetting said ink composition on a surface of an intermediate transfer member forming a film comprising an image thereon, wherein said jetting is performed by thermal, acoustic, or piezoelectric inkjet printing; and
   transferring said image to a printable substrate.

2. The method according to claim 1, wherein the film is a continuous film.

3. The method according to claim 1, wherein the polymeric binder resin comprises polyalkylene resin.

4. The method according to claim 1, wherein the polymeric binder resin comprises a copolymer of styrene.

5. The method according to claim 1, wherein the colorant is a pigment and the jettable ink composition further comprises a polymeric dispersant having an amine head group.

6. The method according to claim 5, wherein the amine head group is basic and selected from a primary or secondary amine, or wherein the amine head group is acidic and is a quaternary amine.

7. The method according to claim 1, wherein the jettable ink composition has a viscosity of about 1 cps to about 50 cps at 25° C.

* * * * *

UNITED STATES PATENT AND TRADEMARK OFFICE
CERTIFICATE OF CORRECTION

PATENT NO. : 9,822,269 B2  
APPLICATION NO. : 14/417111  
DATED : November 21, 2017  
INVENTOR(S) : Yaron Grinwald et al.

Page 1 of 1

It is certified that error appears in the above-identified patent and that said Letters Patent is hereby corrected as shown below:

On the Title Page

In item (72), Inventors, in Column 1, Line 1, delete "Nes Ziona" and insert -- Ness Ziona --, therefor.
In item (72), Inventors, in Column 1, Line 2, delete "Nes Ziona" and insert -- Ness Ziona --, therefor.
In item (72), Inventors, in Column 1, Line 3, delete "Nes Ziona" and insert -- Ness Ziona --, therefor.
In item (72), Inventors, in Column 1, Line 4, delete "Nes Ziona" and insert -- Ness Ziona --, therefor.
In item (72), Inventors, in Column 1, Line 5, delete "Nes Ziona" and insert -- Ness Ziona --, therefor.
In item (72), Inventors, in Column 1, Line 6, delete "Dayan Benjamin" and insert
-- Benjamin Dayan --, therefor.

In the Claims

In Column 16, Line 16, in Claim 1, delete "inkjet printing;" and insert -- inkjet printing: --, therefor.

Signed and Sealed this
Fifth Day of June, 2018

Andrei Iancu
*Director of the United States Patent and Trademark Office*